United States Patent
Liu et al.

(10) Patent No.: US 9,274,532 B2
(45) Date of Patent: Mar. 1, 2016

(54) TEMPERATURE CONTROLLER AND THERMAL CONTROL PLATFORM

(71) Applicants: Chien-Hsing Liu, Taoyuan Hsien (TW); Chieh-Fu Chen, Taoyuan Hsien (TW)

(72) Inventors: Chien-Hsing Liu, Taoyuan Hsien (TW); Chieh-Fu Chen, Taoyuan Hsien (TW)

(73) Assignee: CHROMA ATE INC., Taoyuan Hsien (TW)

( * ) Notice: Subject to any disclaimer, the term of this patent is extended or adjusted under 35 U.S.C. 154(b) by 310 days.

(21) Appl. No.: 13/926,957

(22) Filed: Jun. 25, 2013

(65) Prior Publication Data
US 2014/0008448 A1    Jan. 9, 2014

(30) Foreign Application Priority Data
Jul. 5, 2012    (TW) .............................. 101124162 A

(51) Int. Cl.
    G05D 23/19    (2006.01)
(52) U.S. Cl.
    CPC ................................. G05D 23/1902 (2013.01)
(58) Field of Classification Search
    CPC   G05D 23/19; G05D 23/1902; G05D 23/1919

USPC ......................................................... 236/94
See application file for complete search history.

(56) References Cited

U.S. PATENT DOCUMENTS

| | | |
|---|---|---|
| 6,343,920 B1 | 2/2002 | Terasaki et al. |
| 7,640,760 B2 | 1/2010 | Bash et al. |
| 8,026,515 B1 | 9/2011 | Gorla et al. |
| 2006/0178784 A1 | 8/2006 | Stewart et al. |

FOREIGN PATENT DOCUMENTS

| | | |
|---|---|---|
| CN | 201014927 | 1/2008 |
| TW | 200537265 | 11/2005 |

*Primary Examiner* — Marc Norman
(74) *Attorney, Agent, or Firm* — Locke Lord LLP; Tim Tingkang Xia, Esq.

(57) ABSTRACT

A temperature controller for controlling a thermal module that raises or lowers the temperature of a thermal control platform that includes a reading interface and a control unit. The reading interface is used for reading parameters of the thermal control platform that are stored in a memory module. The control unit is connected to the reading interface for receiving the parameters read by the reading interface and for sending a control signal to the thermal module according to the corresponding parameters. The thermal module then raises or lowers the temperature according to the control signal. Accordingly, the temperature controller automatically adjusts the temperature control to different thermal control platforms.

6 Claims, 2 Drawing Sheets

TEMPERATURE CONTROLLER AND THERMAL CONTROL PLATFORM

PRIORITY CLAIM

This application claims the benefit of the filing date of Taiwan Patent Application No. 101124162, filed Jul. 5, 2012, entitled "TEMPERATURE CONTROLLER AND THERMAL CONTROL PLATFORM," and the contents of which is hereby incorporated by reference in its entirety.

FIELD OF THE INVENTION

The present invention relates to a temperature controller and a thermal control platform, more particularly, to a temperature controller which can read parameters of a thermal control platform automatically and a thermal control platform which can provide parameters for a temperature controller automatically.

BACKGROUND OF THE INVENTION

General thermal control platforms can be used to test electronic components, material properties and even provide a condition for the growth of elements. For example, a thermal control platform can enable the electronic components to be heated to a proper temperature for an electrical test. Alternatively, a thermal control platform can also have a proper internal environment for semiconductor wafers growing epitaxial layers or carbon nanotubes. Therefore, accurate thermal control platforms have a very important impact on the scientific and technological progress.

In the prior art, the thermal control platform comprises a platform body and a thermal module. The platform body is used for carrying an analyte or other objects and can be in any form such as a stage or a cavity. The thermal module is used to raise or lower the temperature of the thermal control platform so as to reach a desired temperature condition. In addition, the thermal control platform can have a built-in temperature sensor to feedback the temperature of the analyte or the platform body to the temperature controller so as to have a more accurate temperature control.

In order to have accurate temperature control and to prevent the thermal module from burning when exceeding the temperature limit, the user must first input the parameters of the thermal control platform into the temperature controller so that the performance of the temperature control can be optimized. The above parameters of the thermal control platform depend on the design of the platform body. For example, the material of the surface of the thermal control platform, the operating temperature range, the PID parameters, the cooling capacity of the cooling structures, the maximum cooling power of the thermal module and the upper limit of the voltage or current of the thermal module are all included in the parameters. The temperature controller can control the input voltage or the input current of the thermal module according to the above parameters to have an accurate temperature control of the thermal control platform.

Because the designs of different thermal control platforms are not the same, it is necessary to input new parameters manually when the user uses a different thermal control platform. Furthermore, when the user uses an identical thermal control platform but with a different temperature controller, it is still necessary to input new parameters for the new temperature controller. The action of re-entering the parameters manually is not only making the operation inconvenient but also increasing the possibility of system errors.

SUMMARY OF THE INVENTION

The present invention is to provide a temperature controller to solve the problem in the prior art.

According to an embodiment of the invention, the temperature controller of the invention is used for controlling a thermal module to raise or lower the temperature of a thermal control platform. The temperature controller comprises a reading interface and a control unit with the control unit connected to the reading interface. The reading interface is used for reading parameters of the thermal control platform that are stored in a memory module. The control unit is used for receiving the parameters read by the reading interface and sending a control signal to the thermal module according to the parameters so as to control the thermal module to raise or lower the temperature of the thermal control platform. With this method of using the reading interface to read the parameters of the thermal control platform, the inconvenience of inputting new parameters manually can be avoided.

Another purpose of the present invention is to provide a thermal control platform to solve the problem in the prior art.

According to an embodiment of the invention, the thermal control platform of the invention comprises a thermal module and a memory module. The thermal module is used for receiving a control signal from a temperature controller to raise or lower the temperature of the thermal control platform. The memory module is used for storing parameters of the thermal control platform and providing parameters for the temperature controller so that the temperature controller can control the thermal module according to the parameters. With the method of the memory module providing the parameters automatically for the temperature controller, the inconvenience of inputting new parameters manually can be avoided.

Many other advantages and features of the present invention will be further described by the following detailed description and the appended drawings.

BRIEF DESCRIPTION OF THE DRAWINGS

To facilitate understanding, identical reference numerals have been used, where it is possible to designate identical elements that are common to the figures.

DETAILED DESCRIPTION

Figure 1:
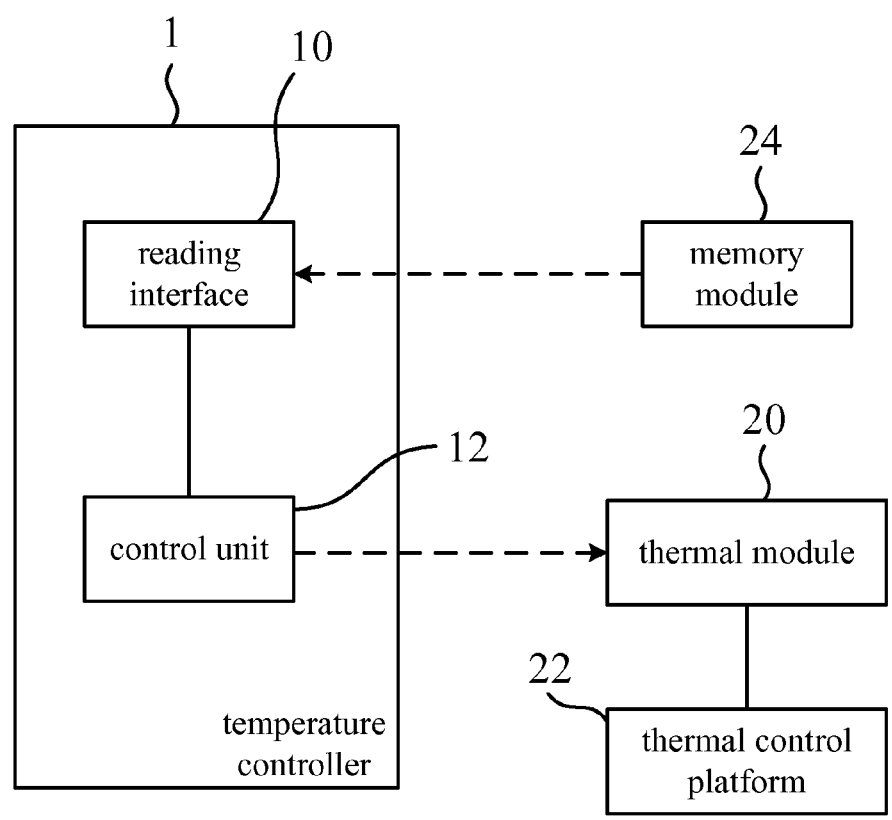
FIG. 1 is a function block diagram illustrating a temperature controller according to an embodiment of the invention.

Please refer to FIG. 1. FIG. 1 is a function block diagram illustrating a temperature controller according to an embodiment of the invention. As shown in FIG. 1, the temperature controller 1 can send a control signal to the thermal module 20 to control the thermal module 20 to raise or lower the temperature of the thermal control platform 22 so as to have a specific temperature condition in the thermal control platform 22. The temperature controller 1 comprises a reading interface 10 and a control unit 12. The control unit 12 is connected with the reading interface 10.

In this embodiment, the reading interface 10 is connected to the memory module 24 through a wired transmission technology or a wireless transmission technology to read parameters of the thermal control platform 22. In actual application, the material of the surface of the thermal control platform 22, the operating temperature range, the PID parameters, the cooling capacity of the cooling structures, the maximum cooling power of the thermal module 20 and the upper limit of the voltage or current of the thermal module 20 are all included in the parameters. The above parameters depend on the design of the thermal control platform 22 and the thermal module 20, that is to say, the parameters of different models or types of the thermal control platform 22 and the thermal module 20 are different. All the above parameters of different models or types of thermal control platforms 22 are stored in the memory module 24, and the reading interface 10 can read the corresponding parameters of the thermal control platform 22 and the thermal module 20 needed.

According to the above embodiment, the reading interface 10 is connected to the memory module 24 through a wired transmission technology or a wireless transmission technology to read parameters of the thermal control platform 22. For example, the wired transmission technology can be I2C, SPI, UART, CAN or some other wired transmission methods and the wireless transmission technology can be infrared transmission, two-dimensional bar code, RFID or some other wireless transmission methods. Likewise, the control unit 12 can send the control signal to the thermal module 20 through a wired transmission technology or a wireless transmission technology. Before reading the parameters of the thermal control platform 22, the reading interface 10 sends an access signal to establish a connection with the memory module 24 so as to receive the parameters from the memory module 24.

After reading the parameters of the thermal control platform 22 from the memory module 24, the control unit 12 sends a control signal to the thermal module 20 according to those parameters so as to control the thermal module 20 to raise or lower the temperature of the thermal control platform 22. In actual application, the control unit 12 figures out the corresponding input voltage and current of the thermal module 20 to the user-set temperature range according to the parameters so that the thermal module 20 can heat or cool the thermal control platform 22 to a specified temperature range. Because the parameters are read by the reading interface 10 from the memory module 24, when the users use different models or types of thermal control platforms 22 and thermal modules 20, the reading interface 10 can read the corresponding parameters automatically without having to input new parameters manually. In summary, the above method is not only increasing the operation convenience but also decreasing the possibility of system errors.

According to the above, the control unit 12 of the temperature controller 1 sends a control signal to the thermal module 20 to raise or lower the temperature of the thermal control platform 22 according to the parameters as well as the user-set temperature range. However, for some specific processes or tests, the required temperature conditions are fixed. In the present invention, the temperature conditions can also be included in the parameters and stored in the memory module 24. With the above method, the control unit 12 can send a control signal to the thermal module 20 according to the parameters to control the thermal module 20 to raise or lower the temperature of the thermal control platform 22 to the required temperature condition directly without the users setting or inputting the temperature condition manually. In addition, the temperature conditions included in the parameters can be set as a loop temperature condition. After receiving the parameters, the control unit 12 can send a control signal with a loop control instruction to repeatedly control the thermal module 20 to raise or lower the temperature of the thermal control platform 22 to reach the required loop temperature condition.

Figure 2:
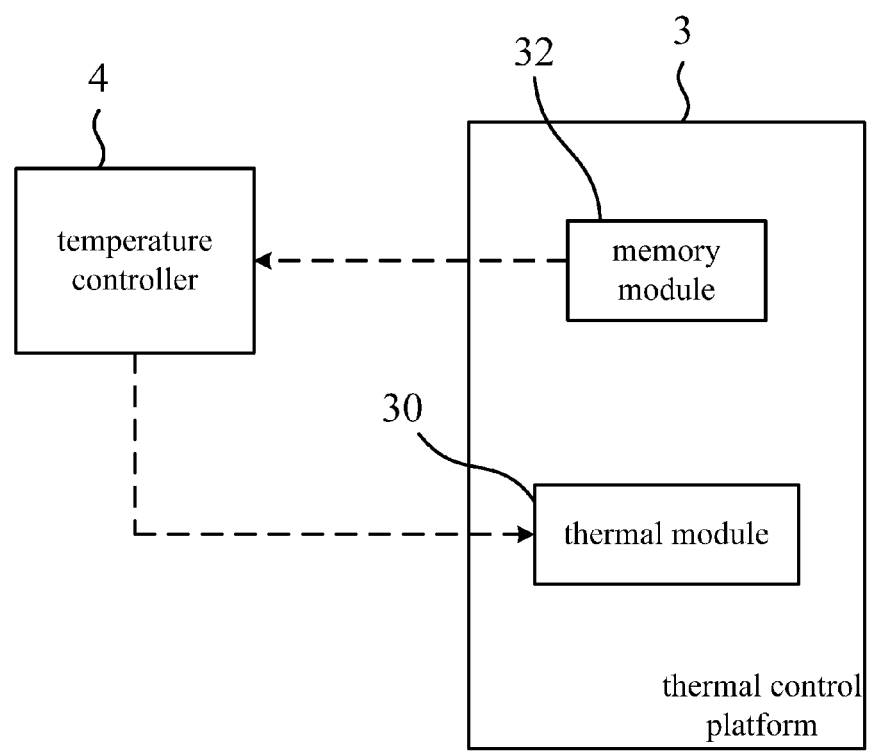
FIG. 2 is a function block diagram illustrating a thermal control platform according to another embodiment of the invention.

Please refer to FIG. 2. FIG. 2 is a function block diagram illustrating a thermal control platform according to another embodiment of the invention. As shown in FIG. 2, the thermal control platform 3 is controlled by a temperature controller 4, the thermal control platform 3 comprises a thermal module 30 and a memory module 32. The thermal module 30 can receive the control signal from the temperature controller 4 to raise or lower the temperature of the thermal control platform 3. In actual application, the temperature controller 4 sends the control signal to the thermal module 30 to control the input voltage or current of the thermal module so as to raise or lower the temperature of the thermal control platform 3. The control platform 3 is used for carrying an analyte or other objects and for providing a specific temperature condition. Further, the control platform 3 can be in any form such as a stage or a cavity.

In this embodiment, the parameters of the thermal control platform 3 such as the material of the surface of the thermal control platform 3, the operating temperature range, the PID parameters, the cooling capacity of the cooling structures, the maximum cooling power of the thermal module 30 and the upper limit of the voltage or current of the thermal module 30 are all stored in the memory module 32. The memory module 32 is connected to the temperature controller 4 through a wired transmission technology or a wireless transmission technology to provide the parameters for the temperature controller 4. In actual application, the above wired transmission technology can be I2C, SPI, UART, CAN or some other wired transmission methods and the above wireless transmission technology can be infrared transmission, two-dimensional bar code, RFID or some other wireless transmission methods.

After receiving the parameters from the memory module 32, the temperature controller 4 can control the thermal module 30 to raise or lower the temperature of the thermal control platform 3 according to the given parameters and the user-set temperature range. In more detail, the temperature controller 4 can figure out the proper input voltage or current of the thermal module 30 according to the parameters so as to control the thermal module 30 to regulate the temperature of the thermal control platform 3 to a specified temperature range. Because the parameters are stored in the memory module 32 of the thermal control platform 3, the memory module 32 can provide the corresponding parameters automatically without the need of inputting new parameters manually when the user uses a different model or type of temperature controller 4.

In actual application, for some specific processes or tests, the required temperature conditions are fixed. Therefore, in this embodiment of the present invention, the temperature conditions can also be included in the parameters and stored in the memory module 32. When the memory module 32 provides the parameters including the temperature conditions for the temperature controller 4, the temperature controller 4 can then directly control the thermal module 30 to raise or lower the temperature of the thermal control platform 3 to the required temperature condition without the users setting or inputting the temperature condition manually. Further, the temperature conditions included in the parameters can be set as a loop temperature condition. When the memory module 32 provides the parameters for the temperature controller 4, the temperature controller 4 can send a control signal with a loop control instruction to repeatedly control the thermal module 30 to raise or lower the temperature of the thermal control platform 3 to reach the required loop temperature condition.

In another embodiment, the thermal control platform 3 can further comprise a temperature sensor for sensing the temperature of the analyte or the platform body. The temperature sensor sends a temperature signal to the temperature controller 4 according to the sensed temperature so as to form a temperature feedback loop.

According to the above embodiment, the temperature controller uses a reading interface to read the parameters of the thermal control platform that are stored in a memory module. When the user uses a different model or type of thermal control platform, the reading interface reads the corresponding parameters automatically from the memory module so that the temperature controller can accurately control a thermal module to raise or lower the temperature of the thermal control platform. In addition, the inconvenience of inputting new parameters manually can be avoided. Alternatively, the thermal control platform of the present invention has a memory module to store the parameters of the thermal control platform and provide the parameters for the temperature controller so as to control the thermal module. When the users use different models or types of temperature controllers, the memory module can provide the parameters of the thermal control platform for the new temperature controller. With the method of the memory module providing the parameters for the temperature controller automatically, the inconvenience of inputting new parameters manually can be avoided. In summary, with the present invention the thermal control platform and the temperature controller can be changed to meet with the demands of the user.

With the example and explanations above, the features and spirits of the invention will hopefully be well described. It is important to note that the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

The invention claimed is:
1. A temperature control system, comprising:
 a thermal module, configured to control a temperature of a thermal control platform to a temperature range; and
 a temperature controller, configured to control the thermal module, the temperature controller comprising:
  a reading interface, configured to read parameters of the thermal control platform, wherein the parameters, which include a plurality of PID parameters, a cooling capacity of a cooling structure of the thermal control platform, a maximum cooling power of the thermal module, and an upper limit of a voltage or current of the thermal module, are stored in a memory module of the thermal control platform; and
  a control unit, connected to the reading interface and configured to compute an input voltage or a current according to the parameters read by the reading interface and the temperature range, and send a control signal to control the thermal module, wherein the control signal instructs the thermal module to set the input voltage or the current.

2. The temperature controller of claim 1, wherein the reading interface is connected to the memory module through a wired transmission technology or a wireless transmission technology.

3. The temperature controller of claim 1, wherein the control signal sent by the control unit based on the parameters of the thermal control platform comprises a loop control instruction, the loop control instruction is used for repeatedly controlling the thermal module to raise or lower the temperature of the thermal control platform.

4. A temperature control system, comprising:
 a thermal control platform, comprising:
  a thermal module, configured to receive a control signal and set an input voltage or a current instructed by the control signal to regulate the thermal control platform to a temperature range; and
  a memory module, configured to store a plurality of parameters of the thermal control platform, wherein the parameters include a plurality of PID parameters, a cooling capacity of a cooling structure of the thermal control platform, a maximum cooling power of the thermal module, and an upper limit of a voltage or current of the thermal module; and
 a temperature controller, configured to compute the input voltage value or the current according to the parameters stored in the memory module.

5. The thermal control platform of claim 4, wherein the memory module is connected to the temperature controller through a wired transmission technology or a wireless transmission technology to provide the parameters for the temperature controller.

6. The thermal control platform of claim 4, wherein the parameters comprises a loop information, the temperature controller control the thermal module to raise or lower the temperature of the thermal control platform according to the loop information of the parameters.

* * * * *